US010855588B2

(12) United States Patent
Sarva et al.

(10) Patent No.: US 10,855,588 B2
(45) Date of Patent: Dec. 1, 2020

(54) FACILITATING FLOW SYMMETRY FOR SERVICE CHAINS IN A COMPUTER NETWORK

(71) Applicant: Juniper Networks, Inc., Sunnyvale, CA (US)

(72) Inventors: Sreelakshmi Sarva, San Jose, CA (US); Harshad Bhaskar Nakil, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/230,668

(22) Filed: Dec. 21, 2018

(65) Prior Publication Data

US 2020/0204492 A1    Jun. 25, 2020

(51) Int. Cl.
*H04L 12/28* (2006.01)
*H04L 12/741* (2013.01)
*G06F 8/61* (2018.01)
*H04L 12/24* (2006.01)
*H04L 12/725* (2013.01)
(Continued)

(52) U.S. Cl.
CPC .............. *H04L 45/745* (2013.01); *G06F 8/61* (2013.01); *H04L 41/0803* (2013.01); *H04L 41/5041* (2013.01); *H04L 45/306* (2013.01); *H04L 45/38* (2013.01); *H04L 45/586* (2013.01);
(Continued)

(58) Field of Classification Search
CPC . H04L 45/745; H04L 41/0803; H04L 45/306; H04L 45/38; H04L 67/34
See application file for complete search history.

(56) References Cited

U.S. PATENT DOCUMENTS 9,571,394 B1   2/2017   Sivaramakrishnan et al.
9,634,936 B2   4/2017   Bansal et al.
(Continued)

FOREIGN PATENT DOCUMENTS

WO    2013184846 A1   12/2013

OTHER PUBLICATIONS

Mackie et al., "BGP-Signaled End-System IP/VPNs," draft-ietf-l3vpn-end-system-06, Network Working Group, Dec. 15, 2016, 32pp.
(Continued)

*Primary Examiner* — Abdelnabi O Musa
(74) *Attorney, Agent, or Firm* — Shumaker & Sieffert, P.A.

(57) ABSTRACT

Techniques are described for facilitating flow symmetry using a scalable service platform that anchors the service chain. The scalable service platform may facilitate flow symmetry and, at least in some cases, flow stickiness for a first packet flow (a "forward packet flow" and a second, related packet flow (a "reverse packet flow") both traversing the service chain in the forward and reverse directions, respectively. For example, a virtualized computing infrastructure may deploy a scalable service platform to perform load balancing of multiple forward packet flows, received from the gateway, among multiple parallel service instances for an ingress service in a service chain. For each corresponding reverse packet flows for the multiple forward packet flows, the scalable service platform load balances the reverse packet flow to the service instance for the egress service in the service chain that is applied to the corresponding forward packet flow.

20 Claims, 5 Drawing Sheets

(51) Int. Cl.
    *H04L 12/721*     (2013.01)
    *H04L 12/713*     (2013.01)
    *H04L 12/803*     (2013.01)
    *H04L 29/06*     (2006.01)
    *H04L 29/08*     (2006.01)

(52) U.S. Cl.
    CPC ........ *H04L 47/125* (2013.01); *H04L 63/0272* (2013.01); *H04L 67/34* (2013.01)

(56) References Cited

U.S. PATENT DOCUMENTS

| | | | |
|---|---|---|---|
| 9,898,317 B2 | 2/2018 | Nakil et al. | |
| 2010/0322239 A1* | 12/2010 | Li | H04L 12/413 370/389 |
| 2014/0254374 A1* | 9/2014 | Janakiraman | H04L 45/66 370/235 |
| 2016/0006654 A1* | 1/2016 | Fernando | H04L 45/74 370/392 |
| 2016/0036707 A1 | 2/2016 | Mestery et al. | |
| 2017/0208011 A1* | 7/2017 | Bosch | H04L 47/25 |
| 2018/0006935 A1 | 1/2018 | Mutnuru et al. | |
| 2018/0091420 A1* | 3/2018 | Drake | H04L 67/327 |
| 2018/0295053 A1* | 10/2018 | Leung | H04L 45/38 |

OTHER PUBLICATIONS

Rosen, "BGP/MPLS IP Virtual Private Networks (VPNs)," Network Working Group, RFC 4364, Feb. 2006, 48pp.

Rijsman, "Service Chain Load Balancing with OpenContrail," OpenContrail Blog, May 2, 2014, http://www.opencontrail.org/service-chain-load-balancing-with-opencontrail/, accessed Dec. 13, 2018, 11 pp.

Extended Search Report from counterpart European Application No. 19180812.0, dated Nov. 28, 2019, 12 pp.

Fernando et al.,"Service Chaining using Virtual Networks with BGP VPNs," draft-ietf-bess-service-chaining-00, Internet Draft, Apr. 13, 2016, 41 pp.

\* cited by examiner

FACILITATING FLOW SYMMETRY FOR SERVICE CHAINS IN A COMPUTER NETWORK

TECHNICAL FIELD

The disclosure relates to a computer networks and, more specifically, to service chaining using computer networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

Virtual networks may also be used to implement service chaining among virtualized network function (VNF) instances or physical devices that apply network functions (or "services") to packet flows in an ordered sequence. A VNF instance or physical device/appliance for applying a service or network function to a packet flow may be referred to as a "service instance." The VNF instances are executed by virtual execution environments in many cases, and a service in a service chain that is applied by one or more VNF instances may be scaled up, responsive to increased load, by spawning more VNF instances. Likewise, the service may be scaled down, responsive to decreased load, by deleting one or more of the VNF instances spawned for the service. The one or more VNF instances for a single service may be hosted by separate computing devices, e.g., compute nodes or servers. For a given service chain, the VNF instances and/or physical devices are interconnected using one or more virtual networks, by which packet flows are forwarded along the ordered sequence for application of the network functions that make up the service chain.

SUMMARY

In general, techniques are described for facilitating flow symmetry using a scalable service platform that anchors the service chain. The scalable service platform may facilitate flow symmetry and, at least in some cases, flow stickiness for a first packet flow (a "forward packet flow") and a second, related packet flow (a "reverse packet flow") both traversing the service chain in the forward and reverse directions, respectively. For example, a virtualized computing infrastructure may deploy a scalable service platform to perform load balancing of multiple forward packet flows, received from the gateway, among multiple parallel service instances for an ingress service in a service chain. For each corresponding reverse packet flows for the multiple forward packet flows, the scalable service platform load balances the reverse packet flow to the service instance for the egress service in the service chain that is applied to the corresponding forward packet flow. The scalable service platform may in this way facilitate flow symmetry among service instances for services in a service chain for packet flows in the forward and reverse direction.

The scalable service platform may be deployed at the ingress to the service chain to receive packets from the gateway and load balance packet flows among the multiple parallel service instances to facilitate flow symmetry. The scalable service platform may include multiple service instances for the load balancing service that is scalable to handle increased traffic loads. In some cases, a controller for the virtualized computing infrastructure configures a virtual network address for a node of the scalable service platform and sends the virtual network address to the gateway to be used by the gateway as a forwarding destination for received packet flows. The node maps the virtual network address to the list of ingress service instances for a service chain in order to perform load balancing for packet flows on a service chain and to facilitate flow symmetry.

The techniques may provide one or more technical advantages. For example, by using a known load balancing algorithm implemented by the scalable service platform to set forward packet flows and corresponding reverse packet flows to service instances of services for a service chain, the scalable service platform may offload responsibility for these tasks from the gateway. This may improve the scalability of service chaining within the virtualized computing infrastructure by reducing a gateway bottleneck. As another example, because different vendor implementations of gateways each executing different load balancing algorithms may alternatively be used as the gateway for a virtualized computing infrastructure, the load balancing algorithm for placing packet flows to ingress a service chain may differ from the load balancing algorithm executed by nodes within the service chain for selecting the next node and corresponding service instance for the next service in the chain. By load balancing at the ingress and at different steps along the service chain using the same, deterministic load balancing algorithm, the scalable service platform may facilitate flow symmetry for forward packet flows and corresponding, respective reverse packet flows.

In one example, a system comprises a network controller for a virtualized computing infrastructure, wherein the network controller is configured to receive a request for a service chain comprising one or more service instances for the service chain; and install, to a server of the virtualized computing infrastructure, an egress service instance of the one or more service instances for the service chain. The system also comprises a scalable service platform, wherein the scalable service platform comprises one or more virtual routers executing on a set of one or more servers, and wherein the one or more virtual routers are configured to create, in response to receiving a forward packet flow from the server hosting the egress service instance, a flow table entry for a reverse packet flow corresponding to the forward packet flow, wherein the flow table entry specifies the server hosting the egress service instance as a next hop for the reverse packet flow, wherein the one or more virtual routers are configured to forward, based on the flow table entry, the reverse packet flow to the server.

In another example, network controller for a virtualized computing infrastructure comprises processing circuitry coupled to a memory device. The network controller is configured to receive a request for a service chain comprising one or more service instances for the service chain; install, to a server of the virtualized computing infrastructure, an egress service instance of the one or more service instances for the service chain; install the one or more service instances for the service chain to one or more servers of the virtualized computing infrastructure, the one or more service instances including the egress service instance; install, to a scalable service platform, a first service instance for an ingress of the service chain; and install, to the scalable service platform comprising one or more virtual routers executing on a set of one or more servers, a second service instance for an egress of the service chain, wherein the first service instance and second service instance operate as endpoints for the service chain to anchor packet flows mapped to the service chain.

In another example, a method comprises receiving, by a network controller for a virtualized computing infrastructure, a request for a service chain comprising one or more service instances for the service chain; installing, by the network controller to a server of the virtualized computing infrastructure, an egress service instance of the one or more service instances for the service chain; installing, by the network controller, the one or more service instances for the service chain to one or more servers of the virtualized computing infrastructure, the one or more service instances including the egress service instance; installing, by the network controller to a scalable service platform, a first service instance for an ingress of the service chain; and installing, by the network controller to the scalable service platform comprising one or more virtual routers executing on a set of one or more servers, a second service instance for an egress of the service chain, wherein the first service instance and second service instance operate as endpoints for the service chain to anchor packet flows mapped to the service chain.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
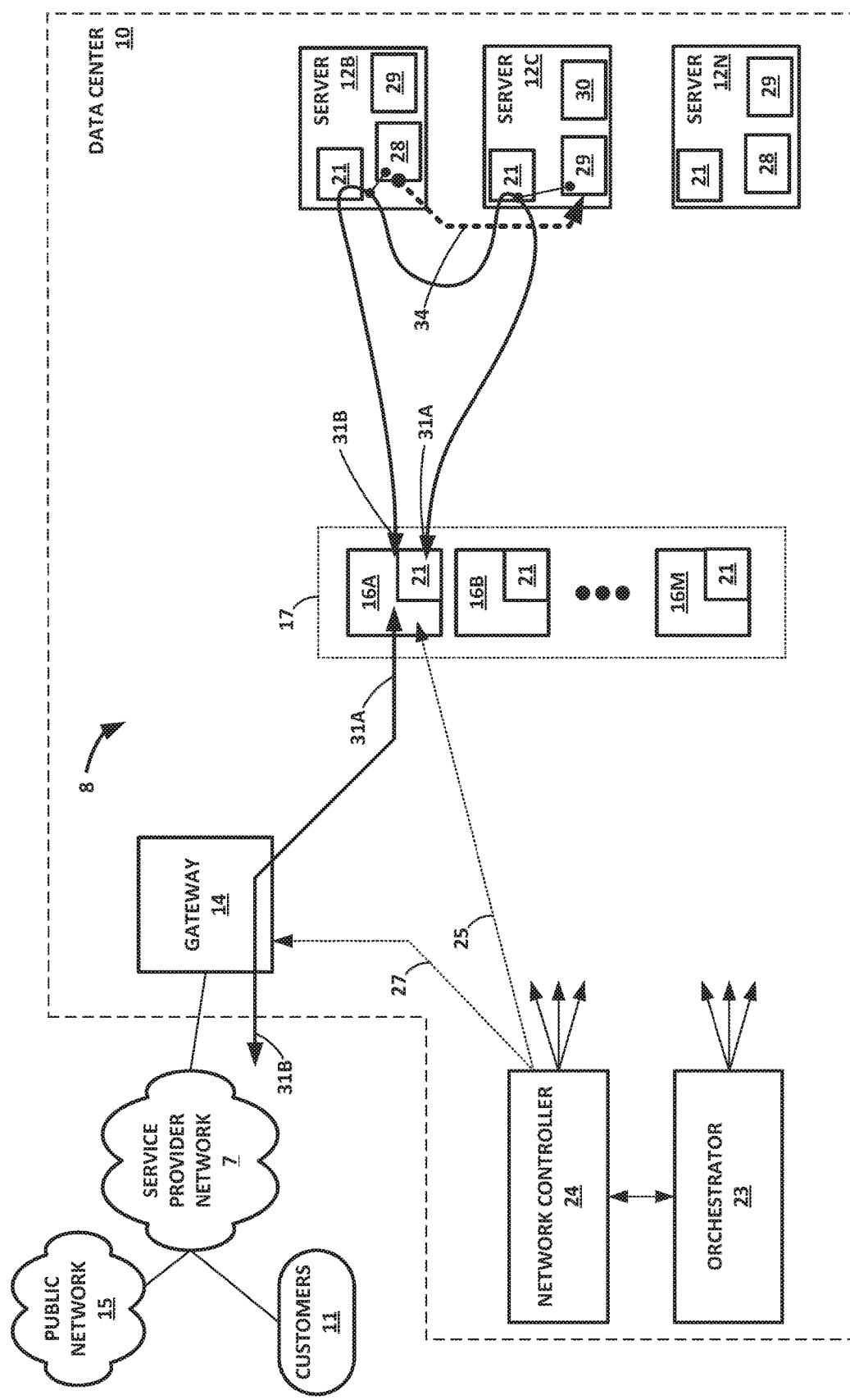
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11. Data center 10 may be reachable by networks deployed by entities other than network service providers. In addition, computing devices within data center 10 may originate, forward, or otherwise send packets to gateway 14 for processing by servers 12A-12N ("servers 12") of data center 10.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers. Service provider network 7 may represent the wide area network (WAN), which may connect data center 10 to another data center, customers 11 networks, or other devices.

In some examples, data center 10 may represent one of many geographically distributed network data centers. As illustrated in the example of FIG. 1, data center 10 may be a facility that provides network services or functions, for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers 12 and servers 16A-16M ("servers 16") interconnected via a switch fabric (not shown) provided by one or more tiers of physical network switches and routers. Servers 12, 16 are computing devices and may also be referred to herein as "hosts" or "host devices," compute nodes, or computing devices. Data center 10 may host many hundreds or even thousands or servers interconnected via the switch fabric. As used herein, "A and/or B" mean A, B, or A and B.

The switch fabric may include interconnected top-of-rack (TOR) (or other "leaf") switches coupled to a distribution layer of chassis (or "spine" or "core") switches. Although not shown, data center 10 may also include, for example, one or more non-edge switches, routers, hubs, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

The switch fabric may provide servers 12, 16 with redundant (multi-homed) connectivity to one another and to service provider network 7. Chassis switches aggregate traffic flows and provides connectivity between TOR switches, TOR switches may be network devices that provide layer 2 (MAC) and/or layer 3 (e.g., IP) routing and/or switching functionality. TOR switches and chassis switches may each include one or more processors and a memory and can execute one or more software processes. Chassis switches may be coupled to gateway 14, which may perform layer 3 routing to route network traffic between data center 10 and customer sites 11 by service provider network 7. Other switching architectures may have more or fewer switching layers, for instance. Further example details of a switch fabric are found in U.S. Pat. No. 9,898,317, issued Feb. 20, 2018, which is incorporated by reference herein in its entirety.

Gateway 14, which may alternatively be referred to as an "edge router" or "edge device," is that device that aggregates customer and WAN connections into and out of data center 10. Gateway 14 may provide hardware or device redundancy using platforms that support control plane and forwarding plane redundancy, link aggregation, multichassis-link aggregation groups (MC-LAG), redundant uplinks.

Gateway 14 may support IPv4 and IPv6, as well as Open Systems Interconnection and MPLS protocols. As the data center 10 might be multi-tenant, gateway 14 may also support one or more routing protocols, such as static routing, Routing Information Protocol (RIP), Open Shortest Path First (OSPF), OSPF with traffic engineering extensions (OSPF-TE), OSPFv3, Intermediate System to Intermediate System (IS-IS), or Border Gateway Protocol (BGP). Gateway 14 may support one or more of Virtual Private LAN Service (VPLS) through the support of bridge domains, overlapping VLAN IDs, integrated routing and bridging (IRB), or IEEE 802.1Q (QinQ). Gateway 14 may support MPLS VPNs, such L3VPN, L2VPN, Ethernet VPNs (EVPNs), and VPLS.

Gateway 14 may represent one or more physical or virtualized routers or other networking devices, such as switches, firewalls, or traffic load balancer (TLBs). Operations described herein with respect to a gateway 14 may instead be performed in whole or in part by a service control gateway or other traffic steering device. Gateway 14 may be an anchor for one or more service chains implemented at least in part using Network Function Virtualization (NFV). Gateway 14 operating as an anchor steers packet flows entering data center 10, via one or communication links with gateway 14, to the appropriate service chain based on, e.g., a route, and/or a policy for a subscriber and/or application. Traffic steering may in this way be subscriber aware and application aware. Subscriber awareness means that different subscribers are assigned to different service chains, depending on the services to which the subscribers are subscribed. A subscriber may be one of customers 11 or a different entity associated with one of customers 11, for instance. Application awareness means that different types of applications (e.g. voice versus video steaming) are assigned to different service chains. Gateway 14 may integrate with a policy or authentication, authorization, and accounting (AAA) server to obtains policies for subscriber awareness. Gateway 14 may provide application-awareness using a Deep Packet Inspection (DPI) function, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Service chains are made up of an ordered list of one or more services, and each service is applied to packet flows by one or more service instances for that service. A PNF instances and VNF instances are examples of service instances. Servers 12 include one or more virtual execution elements to execute service instances 28, 29, and 30. Servers 12 may represent also execute service instances 28, 29, and 30 directly as bare-metal servers. The term "service machines" refers to any physical or virtual device that can execute service instance and encompasses containers, VMs, and bare-metal servers. Service instances 28, 29, and 30 represent different types of network functions. For example, service instances 28 may represent firewall instances, service instances 29 may represent cache instances, and service instances 30 may represent WAN optimization instances. Service chains may include service instances executing in different data centers and in such cases packet flows mapped to these service traverse service provider network 7 among data center 10 and the one or more other data centers.

Each of servers 12 may represent a computing device, such as an x86 processor-based server, configured to operate according to techniques described herein. Servers 12 may provide Network Function Virtualization Infrastructure (NFVI) for an NFV architecture. Any server of servers 12, 16 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a data center 10 edge router represented in system 8 by gateway 14. Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of the data center 10 switching fabric (and in some cases extending outside of data center 10 and a virtual overlay network. The role of the physical underlay network is to provide an "IP fabric," which provides unicast IP connectivity from any physical device (server, storage device, router, or switch) to any other physical device, such as servers 12, 16. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12, 16. (Gateway routers or switches that connect a virtual network to a physical network are an exception and may contain tenant MAC or IP addresses.)

Virtual routers ("vRouters") 21 of servers 12, 16 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3 VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and coups in the Linux kernel on the LXC host. Additional examples of containerization methods include OpenVZ, EreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12, 16 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks. Servers 12, 16 refers to servers 12 and servers 16.

Each of servers 12, 16 may host one or more virtual execution elements each having at least one virtual network endpoint for one or more virtual networks configured in the physical network interconnecting servers 12, 16. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. It is not required that a server 12, 16 host a virtual execution element or virtual network endpoint to execute a virtual router 21.

As shown in FIG. 1, server 12B hosts two virtual network endpoints in the form of two service instances 28 and 29, which may each be executed by a different virtual machine or set of containers. Likewise, server 12N hosts one virtual network endpoint in the form of service instance 29, which may be executed by a virtual machine or set of containers.

However, a server 12, 16 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by a network interface card of a server 12, 16 to perform packet I/O and receive/send packets on one or more communication links with a switch of the switch fabric. Other examples of virtual network interfaces are described below.

Servers 12, 16 each includes at least one network interface card (NIC) (not shown in FIG. 1), which each includes at least one interface to exchange packets with switches of the data center 10 switch fabric over a communication link. Any of the NICs may provide one or more virtual hardware components for virtualized input/output (I/O). A virtual hardware component for I/O maybe a virtualization of a physical NIC (the "physical function"). For example, in Single Root I/O Virtualization (SR-IOV), which is described in the Peripheral Component Interface Special interest Group SR-IOV specification, the PCIe Physical Function of the network interface card (or "network adapter") is virtualized to present one or more virtual network interfaces as "virtual functions" for use by respective virtual network endpoints executing on the server 12, 16. In this way, the virtual network endpoints may share the same PCIe physical hardware resources and the virtual functions are examples of virtual hardware components. As another example, one or more servers 12, 16 may implement Virtio, a para-virtualization framework available, e.g., for the Linux Operating System, that provides emulated NIC functionality as a type of virtual hardware component to provide virtual network interfaces to virtual network endpoints. As another example, one or more servers 12, 16 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12, 16 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12, 16.

Any of the NICs may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with a NIC may be associated with a layer 2 destination address, which may be assigned by the NIC or a software process responsible for configuring the NIC. The physical hardware component (or "physical function" for SR-IOV implementations) is also associated with a layer 2 destination address.

To switch data between virtual hardware components associated with a NIC, internal device switch may perform layer 2 forwarding to switch or bridge layer 2 packets between virtual hardware components and the physical hardware component for the NIC. Each virtual hardware component may be located on a virtual local area network (VLAN) for the virtual network for the virtual network endpoint that uses the virtual hardware component for I/O.

One or more of servers 12, 16 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21 of server 12B, for instance, from the underlying physical network switch fabric of data center 10 may include an outer header to allow the physical network fabric to tunnel the payload or "inner packet" to a physical network address for a NIC of server 12B that executes the virtual router. The outer header may include not only the physical network address of the NIC of the server 12B but also a virtual network identifier such as a VxLAN tag or Multi-protocol Label Switching (MPLS) label that identifies one of the virtual networks as well as the corresponding routing instance executed by the virtual router 21 of server 12B. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12B, for example, for each of the packets outbound from virtual network endpoints hosted by server 12B, the virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination host, such as another one of servers 12, 16. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12, 16 to provide virtualized infrastructure for executing application workloads and services. In some examples, the platform may be a container orchestration platform that automates deployment, scaling, and operations of containers to provide a container-centric infrastructure. In some examples, the platform may be a virtual machine orchestration platform that automates deployment, scaling, and operations of containers to provide a VM-centric infrastructure. The platform may provide both a container infrastructure and a VM infrastructure.

"Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. VM orchestration permits VM coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement an overall controller for the computing infrastructure 8. Orchestrator 23 and network controller 24 may execute on separate computing devices, execute on the same computing device, or each be distributed for execution by multiple computing devices. That is, each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in U.S. Pat. No. 9,898,317 and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual routers 21.

In general, orchestrator 23 controls the deployment, scaling, and operations of virtual execution elements across clusters of servers 12 and providing computing infrastructure, which may include container-centric computing infrastructure and/or VM-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

For example, a pod is a group of one or more logically-related containers (not shown in FIG. 1), the shared storage for the containers, and options on how to run the containers. Where instantiated for execution, a pod may alternatively be referred to as a "pod replica." Each container of a pod is an example of a virtual execution element and may execute a service instance. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Network controller 24 instantiates one or more service chains in data center 10. Network controller 24 creates the services instances 28, 29, 30 for corresponding services. A user of network controller 24 may request a service that specifies the number of service instances for that service. Network controller 24 responsively creates the number of service instances in servers 12. Network controller 24 may include an application programming interface (API) for dynamically changing the number of virtual execution elements for a service.

Network controller 24 may dynamically scale up/down the number of service instances according to the load on the service. Network controller 24 may monitor the load of a service and scale out the service when certain Key Performance indicators (KPIs) are exceeded.

Orchestrator 23 may orchestrate launching virtual execution elements, such as virtual machines, for the service instances. Orchestrator 23 manages the life cycle of applications or complex network functions in the form of service chains that consist of multiple virtual execution elements cooperatively execution to apply services to packet flows. The typical functions of an orchestrator include receiving requests to orchestrate applications, typically via a language to describe the resources in an application: virtual machines, containers, virtual storage, virtual networks, virtual load balancers, virtual databases, etc.; monitoring the liveness of a virtual execution element and to recover from failures by spinning up a new virtual execution element; as already noted, monitoring the load on a virtual execution element and performing scale-out (or scale-in) when KPIs are exceeded. Often, there is an agent in the virtual execution element to allow these KPIs to be application-aware (e.g., HTTP request latency for a web server). Example orchestrators include CloudFormation and CloudWatch offered by Amazon Web Services, Heatand Ceilometer for OpenStack, Contrail/OpenContrail/Tungsten Fabric from Juniper Networks, IBM Smart Cloud Orchestrator (SCO), Amdocs Network Function Virtualization Orchestrator (NFVO), and Scarl.

Orchestrator 23 interfaces with network controller 24 to request virtual networks configurations to enable network connectivity among service instances of a service chain and to steer packet flows mapped to a service chain to each service instance of the service chain in turn. For example, network controller 24 may support an interface for specifying connections between virtual networks, subject to policy constraints. A policy rule may, for instance, allow packets mapped to a service chain to flow from a source virtual network to a destination virtual network while forcing the traffic through the list of service instances. The network controller 23 may create additional routing instances for service virtual execution elements (i.e., virtual execution elements that execute service instances—"service virtual machines" where the virtual execution elements are virtual machines) in addition to any routing instances for virtual execution elements created for and assigned to tenants. Network controller 23 may configure the network to steer traffic by manipulating route targets for routes to influence important and exporting routing from one routing instance in virtual routers 21 to another routing instance in virtual routers 21, as well as by manipulating next hops and/or labels of the routes as such routes are leaked from routing instance to routing instance, so as to force traffic through the right sequence of routing instances and the right sequence of corresponding service virtual execution elements. In other examples, network controller 24 may use other techniques for configuring the virtualized network infrastructure 8 to facilitate traffic steering among service instances for service chaining.

In the example of FIG. 1, network controller installs service chain 34 having service 28 and service 29, with service instances installed by network controller 24. To provide service chain 34 scaling, the network controller 24 installs multiple parallel instances of services 28 and 29. As illustrated, server 12B and 12N each execute one service instance for service 28, and server 12B, 12C, and 12N each execute one service instance for service 29. The arrow labeled 34 for service chain 34 depicts one possible path that may be taken by a packet flow mapped to service chain 34. Another possible path, not illustrated, would be from the service instance for service 28 executing on server 12N to the service instance for service 29 executing on server 12B.

Load balancing algorithms executed by virtual routers 21 and applied to different packet flows cause different packet flows to take the different possible paths for the service chain 34 among the various parallel service instances for each service. Virtual routers 21 execute such load balancing algorithms to perform load balancing, which may include equal-cost multipath (ECMP) load balancing. Example load balancing algorithms include hash functions, such as MD5, by which the virtual routers 21 map features (e.g., elements of the n-tuple, sometimes also including an entropy label) of a packet of a packet flow to an index for a service instance, to which the packet flow is then mapped. A hash function for load balancing may be a symmetric hash function. The load balancing algorithm may be applied to different fields for forward and corresponding, reverse packet flows to cause the load balancing result (e.g., path selection) be the same for the forward and reverse packet flows. For example, the load balancing algorithm may be applied to the source network address for a forward packet flow, and to the destination network address for a reverse packet flow (these network address values will be equal). The load balancing algorithm may be seeded differently at different virtual routers 21.

Packet flow 31A and reverse packet flow 31B are received by gateway 14 for ingress into data center 10. For forward packet flow 31A traversing service chain 34, virtual router 21 executed by server 12B applies a load balancing algorithm to the forward packet flow 31A to map forward packet flow 31A to the service instance 29 executing on server 12C. Packet flow 31A therefore has services applied by service instance 28 of server 12B and then service instance 29 of server 12C. For reverse packet flow 31B, which corresponds to forward packet flow 31A, traversing service chain 34 in the reverse direction, virtual router 21 executed by server 12C may map reverse packet flow 31B to the service instance 28 executing on server 12B. Packet flow 31B therefore has services applied by service instance 29 of server 12C and then service instance 28 of server 12B.

To map the reverse packet flows 31B to facilitate consistent application of the same service instances in the forward and reverse directions of the service chain 34, when virtual router 21 executed by server 12C receives the initial packet for packet flow 31A, the virtual router 21 makes an initial load balancing (e.g., ECMP) decision and records that decision in a flow table to facilitate flow affinity or stickiness (i.e., subsequent packets for packet flow 31A will take the same path). At the same time, the virtual router 21 also creates an entry for the reverse flow to facilitate flow symmetry. Creating the entry for the reverse flow may be done as follows: the virtual router 21 does a lookup for the source IP address of the payload (i.e. the inner IP header) in the forwarding table of the routing instance. This results in set of one or more reverse next-hops. It will be more than one next-hop if ECMP is used. All of these reverse next-hops may be overlay tunnels to the previous service in the service chain 34. The virtual router 21 then observes over which overlay tunnel the initial packet was received (e.g., by analyzing the outer IP header). If the tunnel over which the initial packet arrived is a member of the set of reverse next-hops identified determined earlier, then the virtual router 21 also creates a reverse flow entry (in addition to the forward flow entry). If subsequent packets for the packet flow start arriving over a different tunnel, the virtual router 21 updates the reverse flow entry (so long as it continues to meet the criteria of being a member of the set of reverse next-hops.

In accordance with techniques described in this disclosure, a scalable service platform (SSP) 17 facilitates flow symmetry for packet flows assigned to service chain 34. SSP 17 comprises a scalable set of virtual routers 21 that perform load balancing for ingress to entry point of the service chain 34 (in the forward direction) and ingress to the exit point of the service chain 34 (in the reverse direction). Virtual routers 21 of servers 16 may operate similarly to virtual routers 21 of servers 12, as described above.

Network controller 24 manages the deployment and operation of SSP 17. Network controller 24 receives a request to instantiate service chain 34. In some cases, the request is a new network policy configured for the virtualized computing infrastructure 8. In conjunction with installing service instances for service chain 34 services, network controller 24 may install, to the SSP 17, a service instance for an ingress to the service chain 34 and also install another service instance for an egress of the service chain 34. Network controller 24 may install service instances by defining new configuration states for the virtualized computing infrastructure 8. In some cases, at least one of these new service instances may be installed using a port-tuple object that links the service instance object directly to a port object. With the port-tuple object, the network controller 24 can create ports and pass the port information when creating a service instance. The ports can be created without requiring a launching a service machine, such as virtual execution element in some cases.

To facilitate network connectivity for the new service instances, network controller 24 may send one or more configuration messages 25 to server 16A to define one or more network virtual network interfaces for the additional service instances. For example, configuration messages 25 may configure, in virtual router 21 of server 16A, a first virtual network address for the service instance for the ingress to the service chain 34. Configuration messages 25 may configure, in virtual router 21 of server 16A, a second virtual network address for the service instance for the egress to the service chain 34. The first virtual network address and the second virtual network address may be the same address.

Network controller 24 also sends configuration messages 27 to gateway 14 to program the first virtual network address as a next hop address for packet flows mapped to service chain 34, e.g., forward packet flow 31A, and to program the second virtual network address as a next hop for packet flows mapped to service chain 34 in the reverse direction, e.g., reverse packet flow 31B. As a result, gateway 14 applies the first virtual network address next hop to steer forward packet flow 31A entering the virtualized computing infrastructure 8 to server 16A, and gateway 14 also applies the second virtual network address next hop to steer reverse packet flow 31B entering the virtualized computing infrastructure 8 to server 16A. The next hops may be unicast next hops. As unicast next hops to a single server 16A and service instance executing thereon and not, e.g., ECMP next hops to multiple parallel service instances as may be the case for an ingress service instance of service chain 34, the unicast next hops ensure that gateway 14 steers the packets flows 31A, 31B to the same virtual router 21 (i.e., the virtual router 21 of server 16A), which may then apply a consistent load balancing scheme to facilitate flow symmetry in the forward and reverse directions for the packet flow and, at least in some cases, to facilitate flow stickiness.

That is, as a result of the above configurations, the service instance for the ingress ensures that forward packet flows to gateway 14 and mapped to a service chain are steered to the same server 16 on SSP 17, in the case of service chain 34 to server 16A. The service instance for the egress ensures that corresponding reverse packet flows for the packet flows mapped to the service chain are steered by gateway 14 to the same server 16 on SSP 17, in the case of service chain 34 again to server 16A. The additional service instances also ensure the virtual routers 21 on servers 12 hosting egress service instances 29 for the service chain 34 steer packet flows mapped to service chain 34 to server 16A.

The additional service instances installed to SSP 17 in this way function as additional endpoints for service chain 34, one prior to the ingress and one following the egress. However, unlike the actual service instances that apply services to the packet flows and are scalable to multiple service instances such that load balancing among the multiple service instances must occur, each of the SSP 17 service instances is a single service instance and is not scaled to other servers 16.

The additional service instances being installed to SSP 17 and, more particularly, to server 16A for service chain 34, virtual router 21A may apply the same load balancing algorithm as that applied by other virtual routers 21 in order to determine the ingress service instance for service chain 34. Because virtual routers 21 of servers 16 of SSP 17 apply the same load balancing algorithm as virtual routers 21 of servers 12 on which the service instances for service chain 34 execute, SSP 17 can facilitate flow affinity and flow symmetry for forward packet flow 31A and reverse packet flow 31B.

The first virtual network address configured on server 16A for service instance for the ingress of service chain 34 is mapped to the one or more service instances 28 in virtual router 21 of server 16A. The mapping may be an ECMP next hop. As server 16A receives new packet flows at the first virtual network address (e.g., packet flow 31A), the virtual router 21 selects one of the paths in the ECMP next hop using a load balancing algorithm (e.g., the path to service instance 28 executing on server 12B for packet flow 31A) and sends the packets for the packet flow to the selected next hop.

The technical advantages described above may overcome deficiencies inherent in relying on gateway 14 for performing load balancing to the ingress of service chain 34. Because different vendor implementations of gateway 14 each executing different load balancing algorithms may alternatively be used as the gateway for a virtualized computing infrastructure, the load balancing algorithm for placing packet flows to ingress a service chain may differ from the load balancing algorithm executed by nodes within the service chain for selecting the next node and corresponding service instance for the next service in the chain. By load balancing with a virtual router 21 at the ingress and at different steps along the service chain using the same, deterministic load balancing algorithm applied by the virtual routers 21 of servers 12, 16, the SSP 17 may facilitate flow symmetry for forward packet flow 31A and corresponding reverse packet flow 31B.

Network controller 23 may manage the deployment and scaling of the virtual routers 21 to a scalable set of servers 12, based on the load, in a manner similar to that applied for service instances. In some cases, the operations attributed to virtual routers 21 may be executed by service instances executing on virtual execution elements of the servers 16. The SSP 17 may in this way offload responsibility for these tasks from the gateway 14. This may improve the scalability of service chaining within the virtualized computing infrastructure by reducing a gateway 14 bottleneck.

Figure 2:
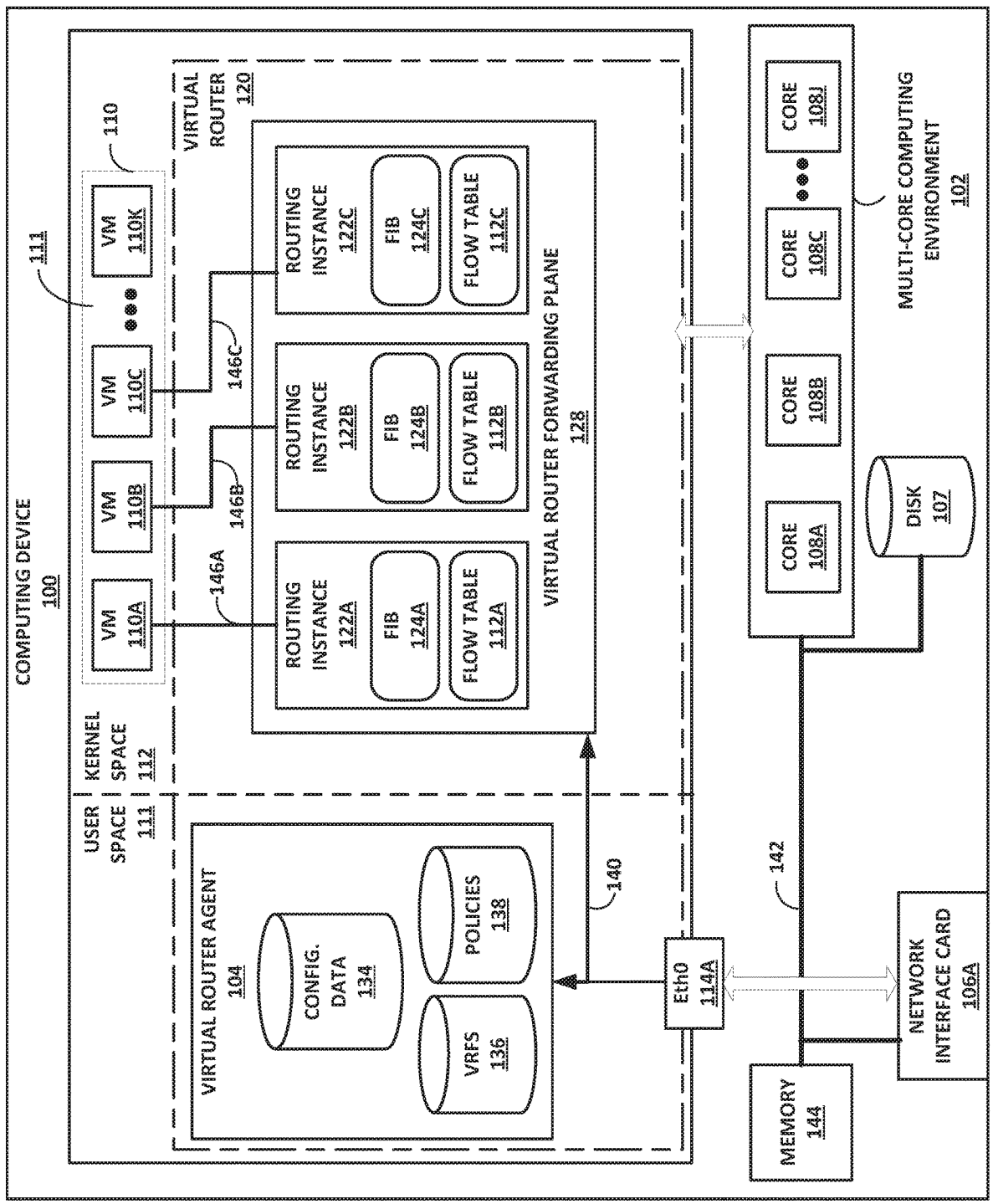
FIG. 2 is a block diagram illustrating a computing device that executes an example virtual router for virtual networks according to techniques described herein.

FIG. 2 is a block diagram illustrating a computing device that executes an example virtual router for virtual networks according to techniques described herein. Computing device 100 may represent any of servers 12, 16 of FIG. 1 or other device, such as any of the fabric switches for an example of virtual computing infrastructure 8.

Computing device 100 includes in this example a system bus 142 coupling hardware components of a computing device 100 hardware environment. System bus 142 couples memory 144, network interface card (NIC) 106A, storage disk 107, and multi-core computing environment 102 having a plurality of processing cores 108A-108J (collectively, "processing cores 108"). Network interface card 106A includes interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108. Computing device 100 may have a single core in some instances.

Memory 144, NIC 106A, storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines hosting service instances of FIG. 1. One or more of virtual machines 110 may instead be containers in some instances. Virtual router 120 may represent an example of any of virtual routers 21 of FIG. 1.

The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 2) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 2). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A represents a device according to a software device model and provide device driver software routines for handling packets for receipt/transmission by corresponding NIC 106A. Packets received by NIC 106A from the underlying physical network fabric for the virtual networks may include an outer header to allow the physical network fabric to tunnel the payload or "inner packet" to a physical network address for NIC 106A. The outer header may include not only the physical network address but also a virtual network identifier such as a VxLAN tag or Multi-protocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106A a packet having an outer header than includes a VxLAN associated in virtual router forwarding plane 128 with routing instance 122A. The packet may have an inner header having a destination virtual network address that is a destination address of VM 110A that taps, via tap interface 146A, into routing instance 122A.

Computing device 100 may be coupled via NIC 106A to a physical network switch fabric that includes an overlay network that extends switch fabric from physical switches to software or "virtual" routers of physical servers coupled to the switch fabric, including virtual router 120. Virtual routers may be processes or threads, or a component thereof, executed by the physical servers, e.g., servers 12, 16 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12, 16. In the example computing device 200 of FIG. 2, virtual router 120 executes within kernel space 112, but virtual router 120 may execute within a hypervisor, a host operating system, a host application, or a virtual machine in various implementations.

Virtual router 120 may replace and subsume the virtual routing/bridging functionality of the Linux bridge/OVS module that is commonly used for Kubernetes deployments of pods 202. Virtual router 120 may perform bridging (e.g., E-VPN) and routing (e.g., L3 VPN, IP-VPNs) for virtual networks. Virtual router 120 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 120 may represent a PE router and virtual execution endpoints may be examples of CE devices described in RFC 4364.

In general, each of VMs 110 may be assigned one or more virtual network addresses for use within respective virtual networks, where each of the virtual networks may be associated with a different virtual subnet provided by virtual router 120. VM 110B may be assigned its own virtual layer three (L3) IP address, for example, for sending and receiving communications but may be unaware of an IP address of the computing device 100 on which VM 110B executes. The virtual network address may thus differ from the logical address for the underlying, physical computer system, e.g., computing device 100.

Computing device 100 includes a virtual router agent 104 that controls the overlay of virtual networks for computing device 100 and that coordinates the routing of data packets within computing device 100. In general, virtual router agent 104 communicates with network controller 24 for the virtualization infrastructure, which generates commands to control create virtual networks and configure network virtualization endpoints, such as computing device 100 and, more specifically, virtual router 120, as a well as virtual network interfaces 146A-146C. By configuring virtual router 120 based on information received from network controller 24, virtual router agent 104 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers VMs 110 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 120. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 120 performs tunnel encapsulation/decapsulation for packets sourced by/destined to any VMs 110, and virtual router 120 may exchange packets with VMs 110 via bus 242 and/or a bridge of NIC 106A.

NIC 106A may receive tunnel packets. Virtual router 120 processes the tunnel packet to determine, from the tunnel encapsulation header, the virtual network of the source and destination endpoints for the inner packet. Virtual router 120 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to rating instance 122A. Routing instance 122A may include forwarding information for the inner packet. For instance, routing instance 122A may map a destination layer 3 address for the inner packet to virtual network interface 146A. Routing instance 122A forwards the inner packet via virtual network interface 146A to VM 110A in response.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router forwarding plane 128 includes multiple routing instances 122A-122C (collectively, "routing instances 122" and also sometimes known as virtual routing and forwarding instances (VRFs)) for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request virtual router agent 104 to install a flow table entry in the flow table for the new packet flow. This may be referred to as "slow-path" packet processing for initial packets of packet flows and is represented in FIG. 2 by slow path 140.

In this example, virtual router agent 104 may be a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with a network controller, such as network controller 24 of FIG. 1. Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In accordance with techniques described in this disclosure, computing device 100 may implement a scalable service platform 17. Computing device 100 may obtain configurations for new service instance for the ingress and egress of a service chain, along with respective virtual network addresses for the new service instances. VMs 110B, 110C may represent the new service instance objects, with virtual network interfaces 146B, 146C corresponding to the virtual network address for the new service instance objects. In some cases, VMs 110B, 110C may not be launched.

FIB 124A maps the virtual network address for the service instance for the ingress to the service chain to a set of one or more next hops to corresponding parallel service instances for the initial service in the service chain. In response to receiving a forward packet flow at the virtual next address for the service instance for the ingress, virtual router forwarding plane 128 applies a load balancing algorithm to select the next hop from the set of one or more next hops, and records the selection in the flow table to map subsequent packets for the forward packet flow to the same selected next hop.

Computing device 100 subsequently receives packets of the forward packet flow at the virtual network address for the service instance for the egress of the service chain, this virtual network address being configured for routing instance 122B. FIB 124B maps the virtual network address for the service instance for the egress of the service chain to the gateway. Virtual router 120 also creates an entry for the reverse packet flow in flow table 112B to map a reverse packet flow, i.e., destined to a source address of the forward packet flow, to the service instance from which the packets of the forward packet flow were received. For example, virtual router 120 may process a packet of the forward packet flow to identify the server 12 hosting the service instance, and virtual router 120 creates the entry for the reverse packet flow in flow table 112B to identified server 12. As a result, virtual router 120 processes the reverse packet flow for the service chain using the entry in flow table 112B to direct the reverse packet flow to the identified server 12, thus facilitating flow symmetry for the packet flows mapped to the service chain.

Figure 3:
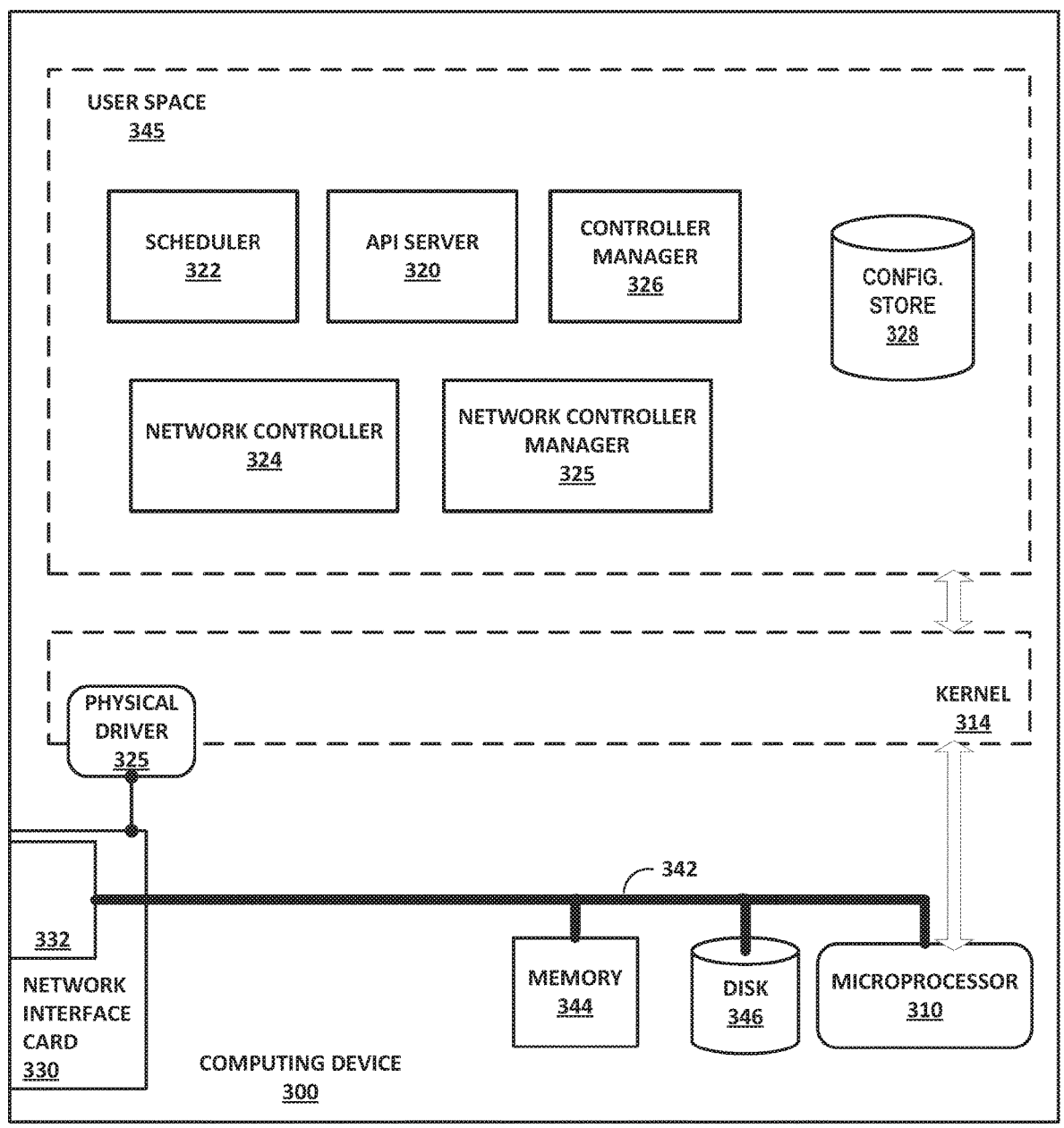
FIG. 3 is a block diagram of an example computing device operating as an instance of controller for a virtualized computing infrastructure, according to techniques described herein.

FIG. 3 is a block diagram of an example computing device operating as an instance of controller for a virtualized computing infrastructure, according to techniques described herein. Computing device 300 an example instance of a computing device for executing one or more aspects of orchestrator 23 and network controller 24 for a virtualized computing infrastructure. Computing device 300 of FIG. 3 may represent one or more real or virtual servers configured to perform operations for at least one of network controller 24 and orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such as virtual routers 21 of FIG. 1 and virtual router 120 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined. Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 PN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. In virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. patent application Ser. No. 14/226,509, incorporated by reference above. Network controller 324 is merely one example of a network controller, and orchestrator 23 may be an orchestrator for any type of virtualized computing infrastructure, such as a virtual machine- or container- and/or bare metal server-based computing infrastructure.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

In accordance with techniques described in this disclosure, network controller 324 configures a scalable service platform 17 and a gateway 14 to facilitate flow symmetry for service chains. In response to receiving a request for a new service chain, network controller 324 may create new service instances for the service chain. Besides those service instances specified for the service chain in the request, network controller 324 may create, in configuration store 328, additional endpoints in SSP 17 in the form of a service instance for the ingress for the service chain and a service instance for the egress for the service chain. The orchestration platform spins up the service instances configured in the configuration store 328 to realize the intended state of the virtualized computing infrastructure.

Network controller 324 creates virtual networks for performing the service chaining. U.S. Pat. No. 9,634,936, issued Apr. 25, 2017, described example techniques for creating service chains using virtual networks and is incorporated by reference herein in its entirety. Network controller 324 creates virtual network addresses for the service instances and programs the SSP 17 node hosting the virtual network addresses with forwarding information for reaching the service instances for the service chain, or the gateway 14, as appropriate.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
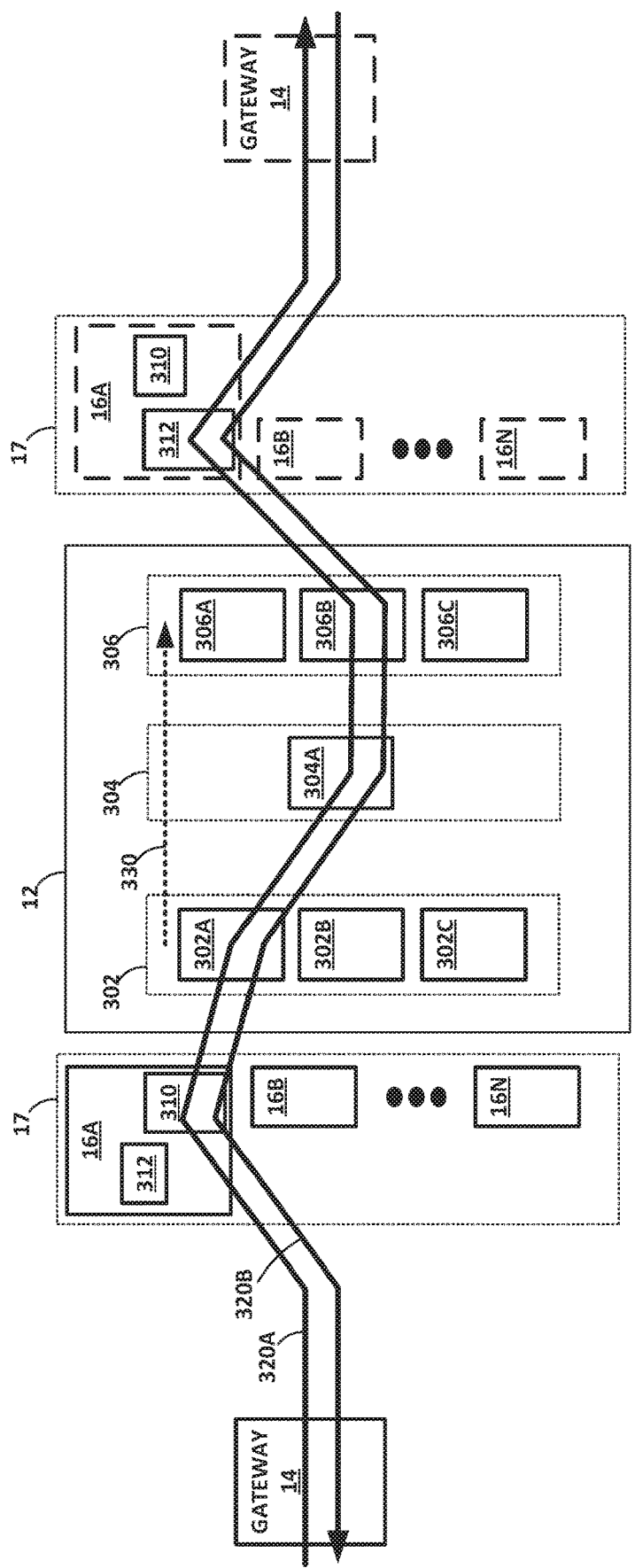
FIG. 4 is a block diagram of a virtualized computing infrastructure, according to techniques described in this disclosure.

FIG. 4 is a block diagram of a virtualized computing infrastructure, according to techniques described in this disclosure. In this example, a service chain 330 includes service instances 302, 304, and 306. Service instance 302 is implemented by parallel service instances 302A-302C executing on one or more servers 12 (not shown in FIG. 4). Service instance 304 is implemented by service instance 304A executing one of servers 12. Service instance 306 is implemented by parallel service instances 306A-306C executing on one or more servers 12.

In accordance with techniques described herein, in conjunction with orchestrating the service chain 330, the orchestrator 23 and network controller 324 orchestrate and configure, on server 16A of SSP 17, service instance 310 for the ingress of service chain 330 and service instance 312 for the egress of service chain 330. Service instances 310, 312 are configured with corresponding virtual network interfaces for virtual networks connecting gateway 14 to the corresponding routing instances configured on server 16A. All forwarding by servers 16, 12 is performed by virtual routers 21 (not shown in FIG. 4).

Gateway 14 receives forwarding packet flow 320 and applies a policy to map the packet flow 320A to the service chain 330 and to the virtual network interface for service instance 310. Gateway 14 forwards packet flow 320A to server 16A hosting service instance 310 for the ingress of service chain 330 and the virtual network interface for the service instance 310. The virtual router 21 of server 16A has an ECMP next hop for the service instances 302A-302C and applies a load balancing algorithm to select service instance 302A. The virtual router 21 of server 16A creates entries in a flow table for the packet flow 320A and for the reverse packet flow 320B. The virtual router 21 for server 12 hosting service instance 302A operates similarly to select service instance 304A hosted by a server 12, and the virtual router 21 for that server operates similar, and so on until the virtual router 21 for the server 12 hosting the service instance 306B forward packet flow 320A to server 16A hosting the service instance 312 for the egress for service chain 330. The virtual router 21 for server 16A forwards the packet flow 320A to gateway 14 to exit the virtualized computing infrastructure.

Having recorded flow entries for the reverse packet flow 320B for corresponding forward packet flow 320A, the virtualized computing infrastructure 8 having gateway 14, servers 16, and servers 12 operates similarly. Moving from right to left in FIG. 4, gateway 14 (shown in dashed lines to illustrate that both illustrations of gateway 14 in FIG. 4 are the same device) forwards the reverse packet flow 320B to the virtual network interface of the service instance 312 for the egress for the service chain 330. The devices then forward the reverse packet flow 320B along the same service instances, though in the reverse direction, selected for the forward packet flow 320A for service chain 330. Other packet flows mapped by gateway 14 to the service chain 330 may take different paths, as determined by the load balancing algorithm applied by the virtual routers 21.

Figure 5:
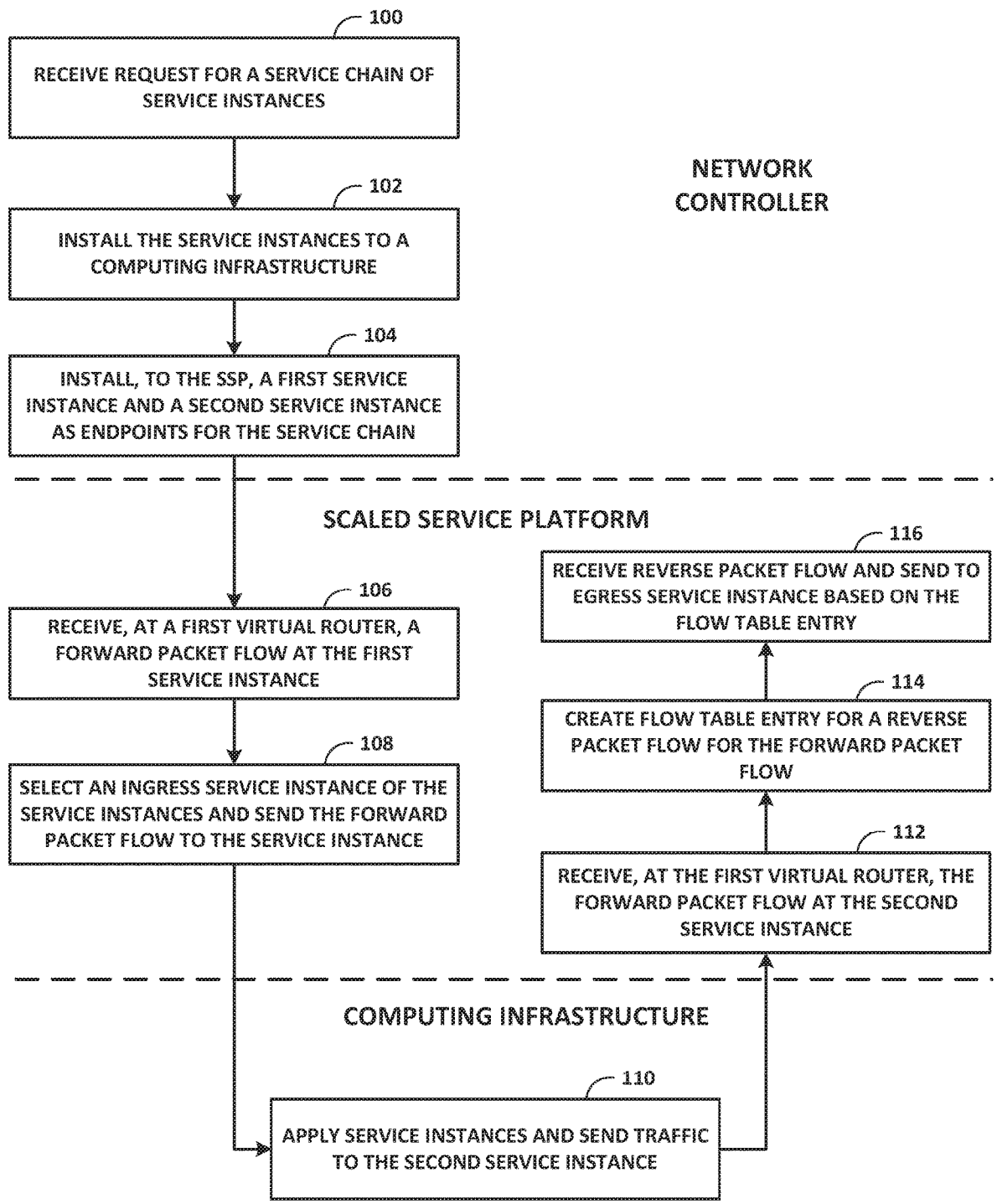
FIG. 5 is a flow diagram, according to techniques described in this disclosure.

FIG. 5 is a flow diagram, according to techniques described in this disclosure. For purposes of example, the operations are described with respect to network controller 24, SSP 17, and servers 12 of FIG. 1, where servers 12 constitute computing infrastructure.

Network controller 24 receives a request for a service chain that includes one or more service instances to be instantiated to a computing infrastructure controlled, at least in part, by network controller 24 (100). Network controller 24 installs the service instances to a computing infrastructure for application, by the computing infrastructure, to packet flows (102). Network controller 24 may scale any of the service instances in the service chain to install multiple parallel service instances for that service instance. An orchestrator 23 may launch virtual execution elements on the service instances to apply the corresponding services, such as firewall, NAT, DPI, etc.

In addition, network controller 24 installs, to SSP 17, a first service instance and a second service instance as endpoints for the service chain (104). The first service instance is logical situated between the gateway 14 and the ingress service instance for the service chain. The second service instance is logically situated between egress service instance for the service chain and the gateway 14. The first service instance, service chain service instances, and second service instance in this way form an extended service chain. Network controller 24 may install the first service instance and a second service instance to a selected server 16A. SSP 17 receives, at the virtual router 21 for server 16A, a forward packet flow at the first service instance (106). The gateway 14 may steer the forward packet flow to the first service instance after having mapped the forward packet flow to the service chain and a virtual network address announced by network controller 24 to the gateway 14, the virtual network address being an address for the first service instance. In response, SSP 17 selects one of the parallel ingress service instances for the service chain and sends the forward packet flow to the selected ingress service instance (108).

The computing infrastructure, represented in FIG. 1 by servers 12, applies the service instances and forwards the forward packet flow along the service chain of service instances, then egresses the forward packet flow to steer the forward packet flow to the second service instance, which effectively constitutes the final endpoint for the service chain (110). The virtual router 21 for server 16A receives, from a particular server executing an egress service instance for the service chain, the forward packet flow at the second service instance (112). The virtual router 21 for server 16A creates a flow table entry for a reverse packet flow for the packet flow, the flow table entry specifying the particular server (from which the forward packet flow was received) as the next hop (114). On receiving the reverse packet flow, the virtual router 21 for server 16A sends, based on the flow table entry, the reverse packet flow to the particular server executing the egress service instance for the service chain (116).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus s as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
   a network controller for a virtualized computing infrastructure, wherein the network controller is configured to:
      receive a request for a service chain comprising one or more service instances for the service chain; and
      install, to a server of the virtualized computing infrastructure, an egress service instance of the one or more service instances for the service chain; and
   a scalable service platform,
   wherein the scalable service platform comprises one or more virtual routers executing on a set of one or more servers,
   wherein the one or more virtual routers are configured to receive a packet for a forward packet flow from the server hosting the egress service instance, wherein the packet comprises an outer Internet Protocol (IP) header comprising an IP address of the server hosting the egress service instance,
   wherein the one or more virtual routers are configured to create, in response to receiving the packet for the forward packet flow and based on the outer IP header of the packet for the forward packet flow, a flow table entry for a reverse packet flow corresponding to the forward packet flow, wherein the flow table entry specifies the IP address of the server hosting the egress service instance as a next hop for the reverse packet flow, and
   wherein the one or more virtual routers are configured to forward, based on the flow table entry, the reverse packet flow to the server hosting the egress service instance.

2. The system of claim 1,
   wherein the network controller is configured to:
      install the one or more service instances for the service chain to one or more servers of the virtualized computing infrastructure, the one or more service instances including the egress service instance;
      install, to the scalable service platform, a first service instance for an ingress of the service chain; and
      install, to the scalable service platform, a second service instance for an egress of the service chain,
   wherein the first service instance and second service instance operate as endpoints for the service chain to anchor packet flows mapped to the service chain.

3. The system of claim 1,
wherein the network controller is configured to install, to the scalable service platform, a second service instance for an egress of the service chain, and
wherein the one or more virtual routers are configured to create a flow table entry for the reverse packet flow by identifying a flow table for a routing instance that implements the second service instance and creating the flow table entry in the identified flow table.

4. The system of claim 1,
wherein the network controller is configured to:
install, to the scalable service platform, a first service instance for an ingress of the service chain; and
configure the first service instance with a virtual network interface having a virtual network address,
wherein the scalable service platform receives the forward packet flow, wherein the forward packet flow is tunneled to the virtual network address.

5. The system of claim 4,
wherein the network controller is configured to send a configuration message to a gateway for the virtualized computing infrastructure to program, in the gateway, the virtual network address as a next hop address for packet flows to be mapped to the service chain.

6. The system of claim 1,
wherein the network controller is configured to, in response to detecting a load on the scalable service platform that exceeds a threshold, add an additional virtual router executing on an additional server to scale up the scalable service platform.

7. The system of claim 1, further comprising:
wherein the network controller is configured to install, to servers of the virtualized computing infrastructure, a plurality of parallel ingress service instances of the one or more service instances for the service chain,
wherein a virtual router of the one or more virtual routers is configured to, in response to receiving a packet of the forward packet flow, select one of the parallel ingress service instances and forward the packet to a server that hosts the selected parallel ingress service instance, and
wherein the virtual router is configured to receive the reverse packet from the server that hosts the selected parallel ingress service instance.

8. The system of claim 7,
wherein the network controller is configured to install, to the virtual router, a first service instance for the ingress of the service chain,
wherein the virtual router is hosted by a server of the set of one or more servers, and
wherein the virtual router is configured to generate and send, to the server that hosts the selected parallel ingress service instance, a tunnel packet having a source network address that is a network address of the server hosting the virtual router.

9. The system of claim 1,
wherein the network controller is configured to:
install the one or more service instances for the service chain to one or more servers of the virtualized computing infrastructure, the one or more service instances including the egress service instance;
install, to the scalable service platform, a first service instance for an ingress of the service chain; and
install, to the scalable service platform, a second service instance for an egress of the service chain, wherein the first service instance and the second service instance each map to a different port-tuple object each defining at least one port.

10. A method comprising:
receiving, by a network controller for a virtualized computing infrastructure, a request for a service chain comprising one or more service instances for the service chain;
installing, by the network controller to a server of the virtualized computing infrastructure, an egress service instance of the one or more service instances for the service chain;
installing, by the network controller, the one or more service instances for the service chain to one or more servers of the virtualized computing infrastructure, the one or more service instances including the egress service instance;
installing, by the network controller to a scalable service platform comprising one or more virtual routers executing on a set of one or more servers, to a first server of the one or more servers of the scalable service platform, a first service instance for an ingress of the service chain;
installing, by the network controller to a second server of the one or more servers of the scalable service platform, a second service instance for an egress of the service chain, wherein the first service instance and the second service instance operate as endpoints for the service chain to anchor packet flows mapped to the service chain,
wherein the second service instance is configured to receive a packet for a forward packet flow from the server hosting the egress service instance, wherein the packet comprises an outer Internet Protocol (IP) header comprising an IP address of the server hosting the egress service instance;
creating, in response to receiving the packet for the forward packet flow and based on the outer IP header of the packet for the forward packet flow, a flow table entry for a reverse packet flow corresponding to the forward packet flow, wherein the flow table entry specifies the IP address of the server hosting the egress service instance as a next hop for the reverse packet flow; and
forwarding, by the second service instance and based on the flow table entry, the reverse packet flow to the server hosting the egress service instance.

11. The method of claim 10, further comprising:
forwarding, by the first service instance and based on a flow table entry for the forward packet flow, the forward packet flow to the server hosting the ingress service instance.

12. The method of claim 10, further comprising:
creating, by the one or more virtual routers, a flow table entry for the reverse packet flow by identifying a flow table for a routing instance that implements the second service instance and creating the flow table entry in the identified flow table.

13. The method of claim 10, further comprising:
configuring, by the network controller, the first service instance with a virtual network interface having a virtual network address,
wherein the scalable service platform receives the forward packet flow and tunnels the forward packet flow tunneled to the virtual network address.

14. The method of claim 13, further comprising:
send, by the network controller, a configuration message to a gateway for the virtualized computing infrastructure to program, in the gateway, the virtual network address as a next hop address for packet flows to be mapped to the service chain.

15. The method of claim 10, further comprising:
adding, by the network controller in response to detecting a load on the scalable service platform that exceeds a threshold, an additional virtual router executing on an additional server to scale up the scalable service platform.

16. The method of claim 10, further comprising:
installing, to servers of the virtualized computing infrastructure, a plurality of parallel ingress service instances of the one or more service instances for the service chain;
selecting, by a virtual router of the one or more virtual routers in response to receiving a packet of the forward packet flow, one of the parallel ingress service instances and forwarding the packet to a server that hosts the selected parallel ingress service instance; and
receiving, by the virtual router, the reverse packet from the server that hosts the selected parallel ingress service instance.

17. The method of claim 16, further comprising:
generating and sending, by the virtual router of the first server of the one or more servers of the scalable service platform that hosts the first service instance for the ingress of the service chain, to the server that hosts the selected parallel ingress service instance, a tunnel packet having a source network address that is a network address of the first server of the one or more servers of the scalable service platform.

18. The method of claim 10,
wherein the first service instance and the second service instance each map to a different port-tuple object each defining at least one port.

19. A network controller for a virtualized computing infrastructure, the network controller comprising processing circuitry coupled to a memory device, wherein the network controller is configured to:
receive a request for a service chain comprising one or more service instances for the service chain;
install, to a server of the virtualized computing infrastructure, an egress service instance of the one or more service instances for the service chain;
install the one or more service instances for the service chain to one or more servers of the virtualized computing infrastructure, the one or more service instances including the egress service instance;
install, to a server of a scalable service platform comprising one or more virtual routers executing on a set of one or more servers, to a first server of the one or more servers of the scalable service platform, a first service instance for an ingress of the service chain;
install, to the server of the scalable service platform, a second service instance for an egress of the service chain, wherein the first service instance and second service instance operate on the server as endpoints for the service chain to anchor packet flows mapped to the service chain,
wherein the second service instance is configured to receive a packet for a forward packet flow from the server hosting the egress service instance, wherein the packet comprises an outer Internet Protocol (IP) header comprising an IP address of the server hosting the egress service instance;
create, in response to receiving the packet for the forward packet flow and based on the outer IP header of the packet for the forward packet flow, a flow table entry for a reverse packet flow corresponding to the forward packet flow, wherein the flow table entry specifies the IP address of the server hosting the egress service instance as a next hop for the reverse packet flow and
forward, by the second service instance and based on the flow table entry, the reverse packet flow to the server hosting the egress service instance.

20. The network controller of claim 19, wherein the network controller is further configured to:
configure the first service instance with a virtual network interface having a virtual network address,
wherein the scalable service platform receives the forward packet flow and tunnels the forward packet flow to the virtual network address.

* * * * *